(12) United States Patent
Ellis

(10) Patent No.: US 6,547,305 B1
(45) Date of Patent: Apr. 15, 2003

(54) BUG SCREEN INTERFACE DEVICE

(76) Inventor: Carlton Ellis, 506 E. Geriod St., P.O. Box 24, East Spencer, NC (US) 28039

( * ) Notice: Subject to any disclaimer, the term of this patent is extended or adjusted under 35 U.S.C. 154(b) by 0 days.

(21) Appl. No.: 09/910,254

(22) Filed: Jul. 20, 2001

(51) Int. Cl.[7] ................................................ B60J 1/20
(52) U.S. Cl. ....................................... 296/91; 296/97.9
(58) Field of Search ........................ 296/91, 97.9, 95.1

(56) References Cited

U.S. PATENT DOCUMENTS

| 2,184,798 A | * | 12/1939 | Gracey ........................ 296/91 |
| 2,638,376 A | * | 5/1953 | Berry .......................... 296/91 |
| 3,815,700 A | | 6/1974 | Mittendorf ................ 180/68 P |
| 4,142,758 A | * | 3/1979 | Scaife ......................... 296/91 |
| 4,262,954 A | | 4/1981 | Thompson .................... 296/91 |
| 4,547,013 A | | 10/1985 | Mcdaniel ..................... 296/91 |
| 5,039,156 A | | 8/1991 | Messmore et al. ........... 296/91 |
| D325,187 S | | 4/1992 | Messmore et al. ......... D12/155 |
| 5,112,095 A | * | 5/1992 | Lund et al. .................... 296/91 |
| 5,292,166 A | * | 3/1994 | Emery .......................... 296/91 |
| 5,320,461 A | * | 6/1994 | Stanesic ...................... 411/258 |
| 5,403,059 A | | 4/1995 | Turner ......................... 296/91 |

* cited by examiner

*Primary Examiner*—D. Glenn Dayoan
*Assistant Examiner*—Paul Chenevert

(57) ABSTRACT

A bug screen interface device for provide a gap blocking interface between a bug deflector and an automobile to reduce the collection of debris. The bug screen interface device includes a main member designed for covering a gap created between a bug deflector and a hood of an automobile, and an attachment member coupled to the main member and designed for coupling the main member to a back side of the bug deflector.

6 Claims, 2 Drawing Sheets

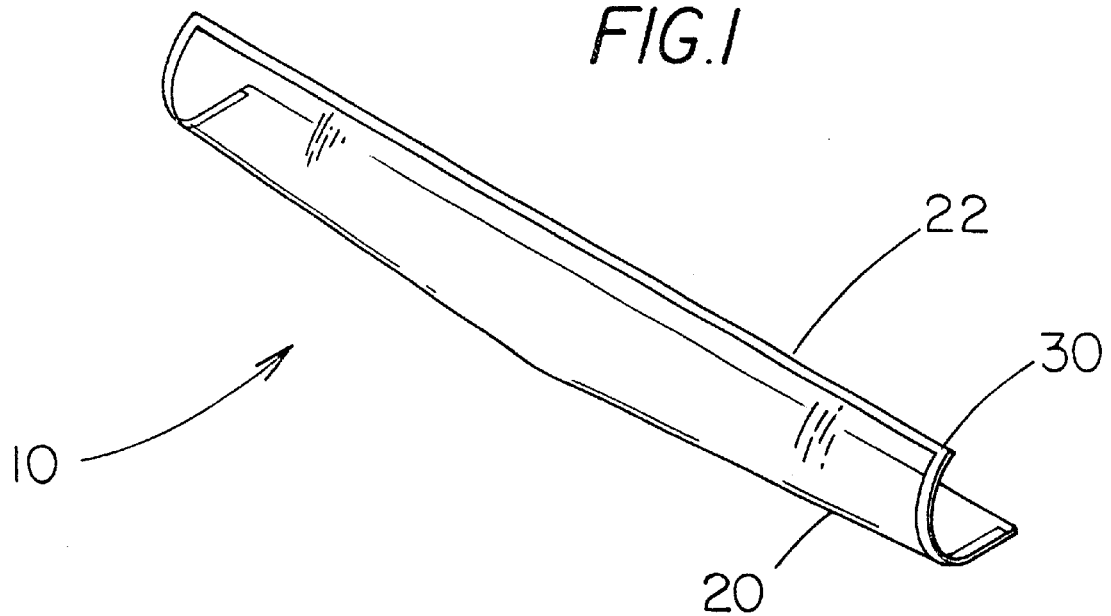
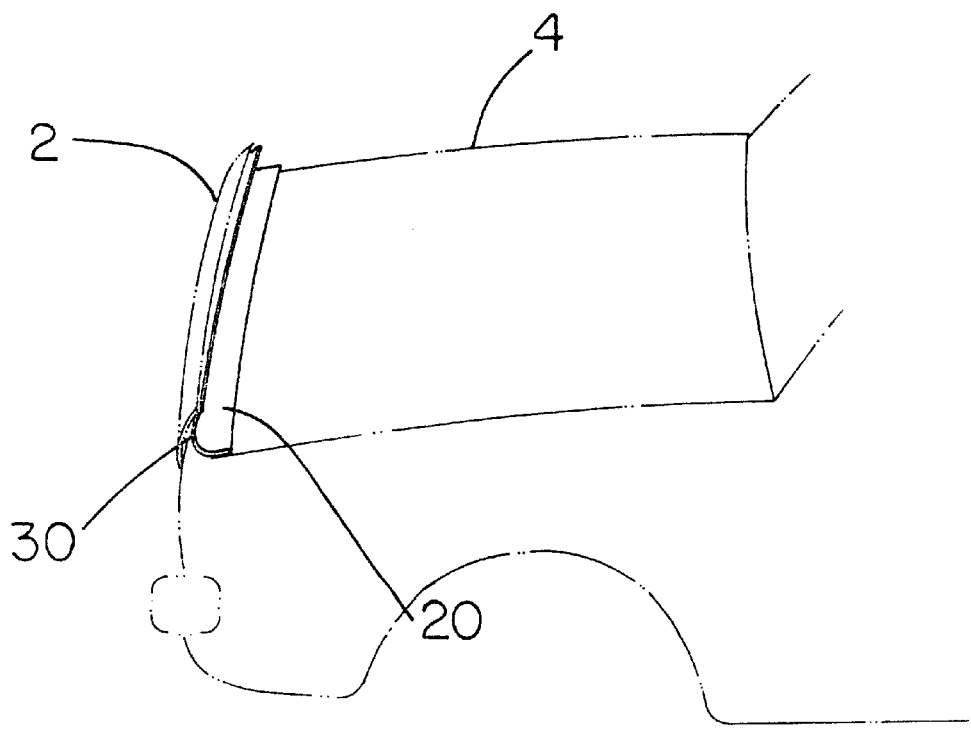

BUG SCREEN INTERFACE DEVICE

BACKGROUND OF THE INVENTION

Field of the Invention

The present invention relates to bug deflectors and more particularly pertains to a new bug screen interface device for provide a gap blocking interface between a bug deflector and an automobile to reduce the collection of debris.

Description of the Prior Art

The use of bug deflectors is known in the prior art. More specifically, bug deflectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,262,954; U.S. Pat. No. 5,039,156; U.S. Pat. No. 3,815,700; U.S. Pat. No. 5,403,059; U.S. Pat. No. 4,547,013; and U.S. Pat. No. Des. 325,187.

While these devices fulfill their respective, particular objectives and requirements, the aforementioned patents do not disclose a new bug screen interface device. The inventive device includes a main member designed for covering a gap created between a bug deflector and a hood of an automobile, and an attachment member coupled to the main member and designed for coupling the main member to a back side of the bug deflector.

In these respects, the bug screen interface device according to the present invention substantially departs from the conventional concepts and designs of the prior art, and in so doing provides an apparatus primarily developed for the purpose of provide a gap blocking interface between a bug deflector and an automobile to reduce the collection of debris.

SUMMARY OF THE INVENTION

In view of the foregoing disadvantages inherent in the known types of bug deflectors now present in the prior art, the present invention provides a new bug screen interface device construction wherein the same can be utilized for provide a gap blocking interface between a bug deflector and an automobile to reduce the collection of debris.

The general purpose of the present invention, which will be described subsequently in greater detail, is to provide a new bug screen interface device apparatus and method which has many of the advantages of the bug deflectors mentioned heretofore and many novel features that result in a new bug screen interface device which is not anticipated, rendered obvious, suggested, or even implied by any of the prior art bug deflectors, either alone or in any combination thereof.

To attain this, the present invention generally comprises a main member designed for covering a gap created between a bug deflector and a hood of an automobile, and an attachment member coupled to the main member and designed for coupling the main member to a back side of the bug deflector.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bug screen interface device apparatus and method which has many of the advantages of the bug deflectors mentioned heretofore and many novel features that result in a new bug screen interface device which is not anticipated, rendered obvious, suggested, or even implied by any of the prior art bug deflectors, either alone or in any combination thereof.

It is another object of the present invention to provide a new bug screen interface device which may be easily and efficiently manufactured and marketed.

It is a further object of the present invention to provide a new bug screen interface device which is of a durable and reliable construction.

An even further object of the present invention is to provide a new bug screen interface device which is susceptible of a low cost of manufacture with regard to both materials and labor, and which accordingly is then susceptible of low prices of sale to the consuming public, thereby making such bug screen interface device economically available to the buying public.

Still yet another object of the present invention is to provide a new bug screen interface device which provides in the apparatuses and methods of the prior art some of the advantages thereof, while simultaneously overcoming some of the disadvantages normally associated therewith.

Still another object of the present invention is to provide a new bug screen interface device for provide a gap blocking interface between a bug deflector and an automobile to reduce the collection of debris.

Yet another object of the present invention is to provide a new bug screen interface device which includes a main member designed for covering a gap created between a bug deflector and a hood of an automobile, and an attachment member coupled to the main member and designed for coupling the main member to a back side of the bug deflector.

Still yet another object of the present invention is to provide a new bug screen interface device that can be retrofit onto any automobile with a bug deflector.

Even still another object of the present invention is to provide a new bug screen interface device that is small and unobtrusive.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new bug screen interface device according to the present invention.

FIG. 2 is a schematic perspective view of the present invention in use.

DESCRIPTION OF THE PREFERRED EMBODIMENT

Figure 3:
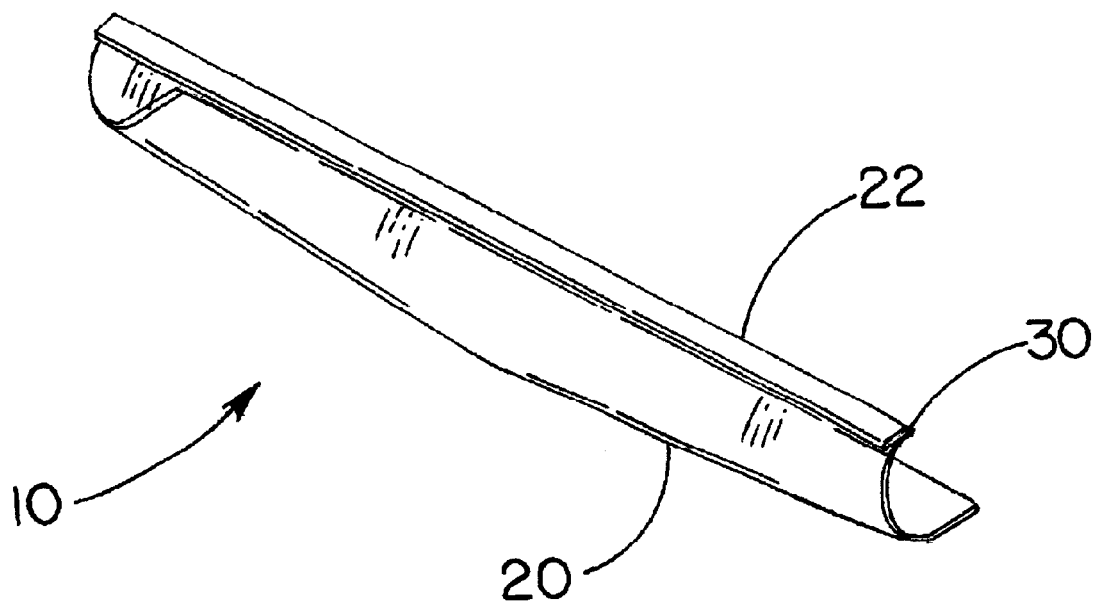
FIG. 3 is a schematic perspective view of an embodiment of a new bug screen interface device according to the present invention.

With reference now to the drawings, and in particular to FIGS. 1 through 3 thereof, a new bug screen interface device embodying the principles and concepts of the present invention and generally designated by the reference numeral 10 will be described.

As best illustrated in FIGS. 1 through 3, the bug screen interface device 10 generally comprises a main member 20, and an attachment member 30.

The main member 20 is designed to cover a gap created between a bug deflector 2 and a hood 4 of an automobile.

The attachment member 30 is coupled to the main member 20. The attachment member 30 is designed for coupling the main member 20 to a back side of the bug deflector 2.

In an embodiment, the attachment member 30 comprises an adhesive strip, which is positioned along a perimeter edge 22 of the main member 20. The adhesive strip 30 is used to bond the main member 20 to the bug deflector 2.

In a further embodiment, the main member 20 comprises an elastomeric material.

In yet a further embodiment the main member 20 is substantially clear.

In still yet a further embodiment the main member 20 has a width of approximately one inch. The width is designed for filling the gap between the bug deflector 2 and the hood 4 of the automobile.

In another embodiment the main member 20 is a substantially clear polycarbonate.

In a further embodiment the attachment member 30 is a clip designed to capture an edge of the bug deflector 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim

1. A bug screen interface device attached to a bug deflector for preventing the accumulation of debris between a bug deflector and an automobile hood comprising:

a bug screen main member adapted for covering a gap created between a bug deflector and a hood of an automobile;

an attachment member coupled to said bug screen main member, said attachment member being adapted for coupling said bug screen main member to a back side of the bug deflector; and wherein said attachment member comprises an adhesive strip positioned along a perimeter edge of said bug screen main member, said adhesive strip being for adhesively bonding said bug screen main member to the bug deflector.

2. The bug screen interface device of claim 1, wherein said bug screen main member comprises a substantially clear polycarbonate material.

3. The bug screen interface device of claim 1, wherein said bug screen main member comprises an elastomeric material.

4. The bug screen interface device of claim 3, wherein said bug screen main member is substantially clear.

5. The bug screen interface device of claim 1 wherein said bug screen main member has a width of approximately one inch, said width being adapted for filling the gap between the bug deflector and the hood of the automobile.

6. A bug screen interface attached to a bug deflector device for preventing the accumulation of debris between a bug deflector and an automobile hood comprising:

a bug screen main member adapted for covering a gap created between a bug deflector and a hood of an automobile;

an attachment member coupled to said member, said attachment member being adapted for coupling said bug screen main member to a back side of the bug deflector;

said attachment member comprises an adhesive strip positioned along a perimeter edge of said main member, said adhesive strip being for adhesively bonding said bug screen main member to the bug deflector;

wherein said bug screen main member comprises an elastomeric material;

wherein said bug screen main member is substantially clear; and wherein said bug screen main member has a width of approximately one inch, said width being adapted for filling the gap between the bug and the hood of the automobile.

* * * * *